United States Patent [19]

Pinkerton

[11] Patent Number: 4,867,778
[45] Date of Patent: Sep. 19, 1989

[54] INDIVIDUAL SECTION GLASS FORMING MACHINE

[75] Inventor: Steven J. Pinkerton, Ridgefield, Conn.

[73] Assignee: Emhart Industries, Inc., Farmington, Conn.

[21] Appl. No.: 152,687

[22] Filed: Feb. 5, 1988

[51] Int. Cl.⁴ .............................................. C03B 11/16
[52] U.S. Cl. ...................................... 65/318; 65/160; 65/161
[58] Field of Search ................. 65/160, 161, 215, 236, 65/246, 308, 318

[56] References Cited

U.S. PATENT DOCUMENTS

| | | | |
|---|---|---|---|
| 3,471,281 | 10/1969 | Bittner et al. | 65/318 X |
| 3,607,194 | 9/1971 | Ayers | 65/318 X |
| 3,953,187 | 4/1976 | James | 65/161 |
| 4,632,689 | 12/1986 | Willigen et al. | 65/308 X |
| 4,723,976 | 2/1988 | Shanaberger | 65/318 X |

Primary Examiner—Robert L. Lindsay
Attorney, Agent, or Firm—Spencer T. Smith

[57] ABSTRACT

The displacement of one or more of the plungers in an individual section glass forming machine is monitored so that the location of the plungers, when each mold cavity has completely filled (parison formation point), can be determined. When a plunger is located at the parison formation point the feed pressure is reduced by a selectable amount.

4 Claims, 1 Drawing Sheet

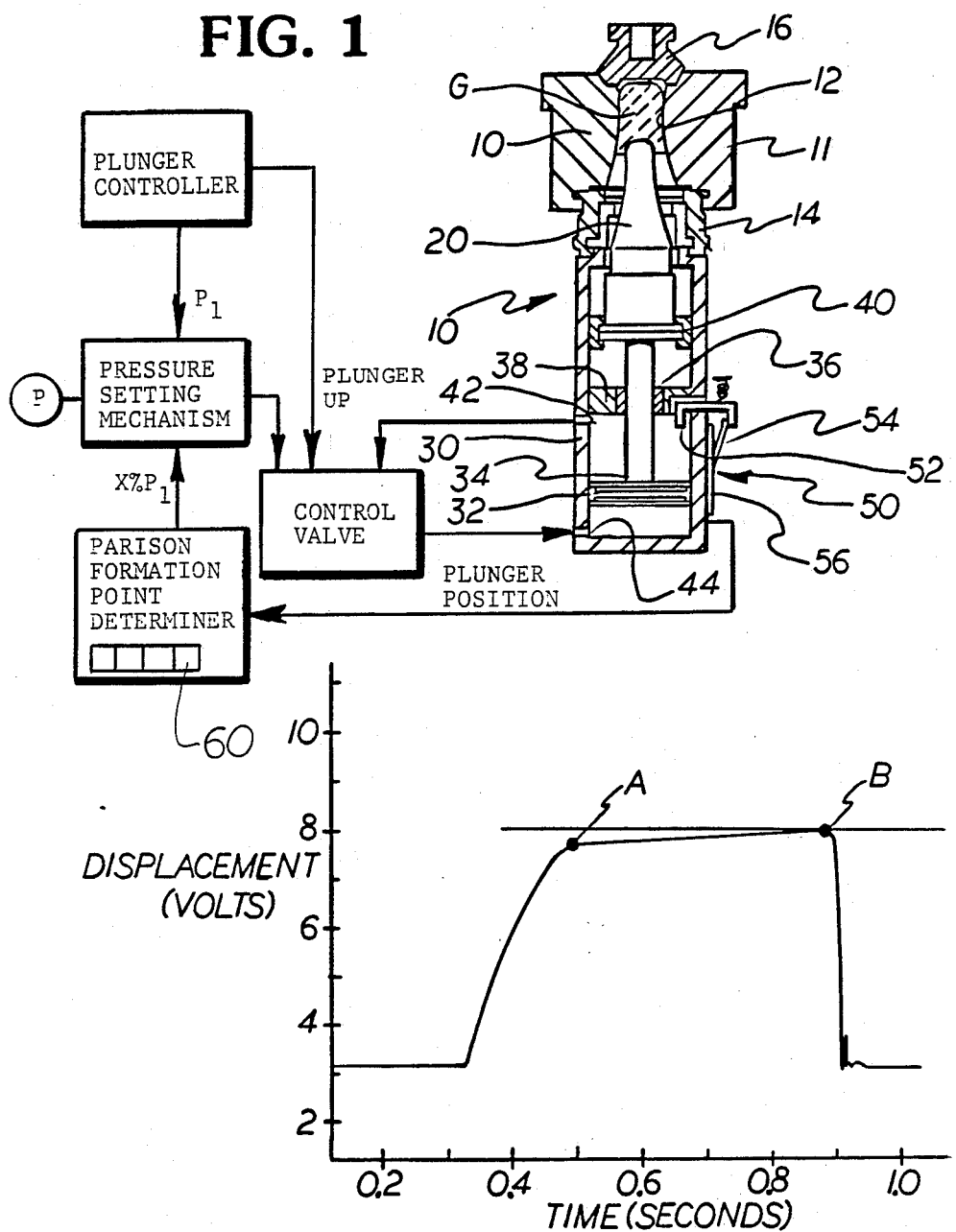

INDIVIDUAL SECTION GLASS FORMING MACHINE

The present invention relates to the simultaneous forming of gobs of molten glass into parisons in a multi-gob, individual section, glass forming machine.

It is an object of the present invention to increase the uniformity of product made by such multi-gob, individual section, glass forming machines.

Other objects and advantages of the present invention will become apparent from the following portion of the specification and from the following drawings, which illustrate in accordance with the mandate of the patent statutes, a presently preferred embodiment incorporating the principles of the invention.

Referring to the drawings:

FIG. 1 is a diagrammatic view of one of the parison mold assemblies of an individual section, glass forming machine; and FIG. 2 is a graph illustrating the final portion of the movement of the mold assembly plunger in forming a parison.

A glassware forming machine of the individual section, multi-gob type, has a number of individual sections each having a selected number (usually 2, 3 or 4) of parison mold assemblies 10 for simultaneously forming a corresponding number of parisons. Each of these mold assemblies 10 includes two mold halves 11 which are movable between an advanced position where they engage one another and other parts of the mold assembly to form a mold cavity 12 and a retracted position where the mold halves 11 are spaced to permit removal of a formed parison. A neck ring 14 cooperates with the mold halves 11 to define the cavity 12 and is arranged to grip the neck portion of a formed parison so that the parison can be transferred from the mold cavity to a blow mold. A baffle 16, movable into a position on top of the engaging mold halves 11, defines the upper surface of the mold cavity and is moved to a remote location prior to parison removal.

Each mold assembly also has a plunger mechanism including a plunger 20. The plunger 20 is first moved from its out-of-the-way position to its intermediate position where the plunger projects upwardly into the mold cavity. A gob of molten glass is dropped into the mold cavity 12 and rests on the plunger 20. The plunger is then advanced under a constant feed pressure from this intermediate position to press the glass against the walls of the cavity 12 to form the parison. In FIG. 1 the plunger is shown during its advancement from the intermediate position to its fully advanced position. The plunger is then retracted to its intermediate position by cutting the feed pressure and applying a retract pressure and then retracted from the intermediate position to the out-of-the-way position to allow for removal of the parison.

The plunger mechanism also has a cylinder 30, a piston 32 movable in the cylinder 30, and a piston rod 34 projecting from the piston 32 through a seal 36 in an upper end cap 38 of the cylinder 30. The plunger 20 is mounted on an upper end portion of the piston rod 34 by a clamping ring 40. Pressurized hydraulic fluid introduced into the cylinder 30 through an upper entry port 42 causes the piston 32 to move downwards in the cylinder 30, and the introduction of the fluid through port 44 causes the piston 32 to move upwardly in the cylinder 30.

Each parison mold assembly also has a Control Valve which can alternately apply pressure to the appropriate cylinder ports 42, 44. The condition of the Control Valve (whether pressure is to be inputted via port 42 (plunger down) or port 44 (plunger up)) is controlled by a Plunger Controller (the system is illustrated with the Control Valve in the plunger up condition). The Control Valve is connected to pump P via a Pressure Setting Mechanism (a restrictor operated by a servo mechanism, for example), and the system is illustrated as the plunger is being advanced from the intermediate to the operative position with the Plunger Controller defining the desired feed pressure P1 for the Pressure Setting Mechanism.

It is within the last ⅜" of plunger stroke that the mold cavity becomes completely filled in the parison forming process. To track the displacement of each plunger throughout this portion of the stroke, each Parison Mold Assembly includes a displacement probe assembly having a linear potentiometer 50 secured to the plunger housing 30. As a plunger is displaced through this ⅜", the piston 32 of that plunger will engage and displace a probe 52 to which is secured the potentiometer wiper 54. The displacement of this wiper 54 along the potentiometer element 56 changes the output of the linear potentiometer.

FIG. 3 illustrates a plot of plunger displacement (voltage), as sensed by the probe, versus time, zero seconds being when the Plunger Controller commences plunger displacement (fires "plunger-up" solenoid, for example). This plot reveals a linear or constant velocity region between points A and B. Since the pressure is constant during this plunger advancement, the force exerted on the glass by the plunger remains constant. It is believed that point A is the point where the mold cavity has completely filled (the parison formation point) and that from point A to point B, the glass is cooling, and hence, shrinking. Point B corresponds to the time when the Plunger Controller commences plunger retraction (fires "plunger-down" solenoid, for example).

The Parison Formation Point Determiner for each plunger, which receives positional data from its associated displacement probe assembly determines when Point A has been reached (has determined that the displacement curve has become linear), and defines a new pressure setting (X%P1) to the Pressure Setting Mechanism. This drops the pressure applied by the plunger, thereby preventing the undesired opening of the molds prior to Point B. A thumb wheel switch or the like 60 may be used to input the value of "X" which could be 70, for example.

I claim:

1. An individual section, glass forming machine comprising
   at least one parison mold assembly including a plunger displaceable from a retracted position to a fully inserted position,
   means for displacing said plunger from said retracted to said fully inserted position, said plunger advancing to a parison formation point where the mold cavity has become completely full and then to the fully inserted position as the formed parison cools,
   said displacing means including means for applying a selected pressure to said plunger as said plunger approaches said parison formation point, means for sensing the actual position of said plunger throughout at least the last portion of its displacement which includes the parison formation point, computer means for determining when the displacement curve for said plunger, during said portion of its displacement becomes linear to locate the actual parison formation point for said plunger, and means for decreasing said selected pressure by a predetermined amount when said computer means determines that said plunger has been displaced to said parison formation point.

2. An individual section, glass forming machine according to claim 1 comprising a plurality of parison mold assemblies.

3. An individual section, glass forming machine according to claim 1, wherein said determining means includes means for inputting said predetermined amount.

4. An individual section, glass forming machine according to claim 3, wherein said sensing means comprises a linear potentiometer.

* * * * *